United States Patent [19]
Anderson

[11] 3,744,737
[45] July 10, 1973

[54] FILM CASETTE

[76] Inventor: Ray C. Anderson, 3905-E. 67th Street, Tulsa, Okla.

[22] Filed: Apr. 5, 1971

[21] Appl. No.: 131,163

Related U.S. Application Data

[62] Division of Ser. No. 806,619, March 12, 1969, Pat. No. 3,687,560.

[52] U.S. Cl. .............................................. 242/197
[51] Int. Cl. .............................................. G03b 23/02
[58] Field of Search ................ 242/197, 198, 199, 242/200, 210, 71.1, 71.2; 179/100.22; 352/72, 78

[56] References Cited
UNITED STATES PATENTS

| | | |
|---|---|---|
| 3,536,276 | 10/1970 | Bundschoh et al. ............ 242/197 X |
| 3,150,840 | 9/1964 | Briskin et al. ...................... 242/195 |
| 3,191,881 | 6/1965 | Campbell, Sr. et al. ........ 242/71.1 X |
| 3,305,188 | 2/1967 | Sampson ............................ 242/197 |
| 3,090,574 | 5/1963 | Doncaster et al. ............... 242/198 X |
| 3,489,371 | 1/1970 | Smith ................................. 242/210 |

Primary Examiner—George F. Mautz
Attorney—Frank R. Thienpont

[57] ABSTRACT

A film casette for use in an automatic film feeding projector, the casette being constructed so that the projector mechanism may cooperate therewith to automatically unwind and rewind the film in the casette.

3 Claims, 8 Drawing Figures

PATENTED JUL 10 1973

Inventor:
Ray C. Anderson
By: Frank R. Thuenpont
Atty.

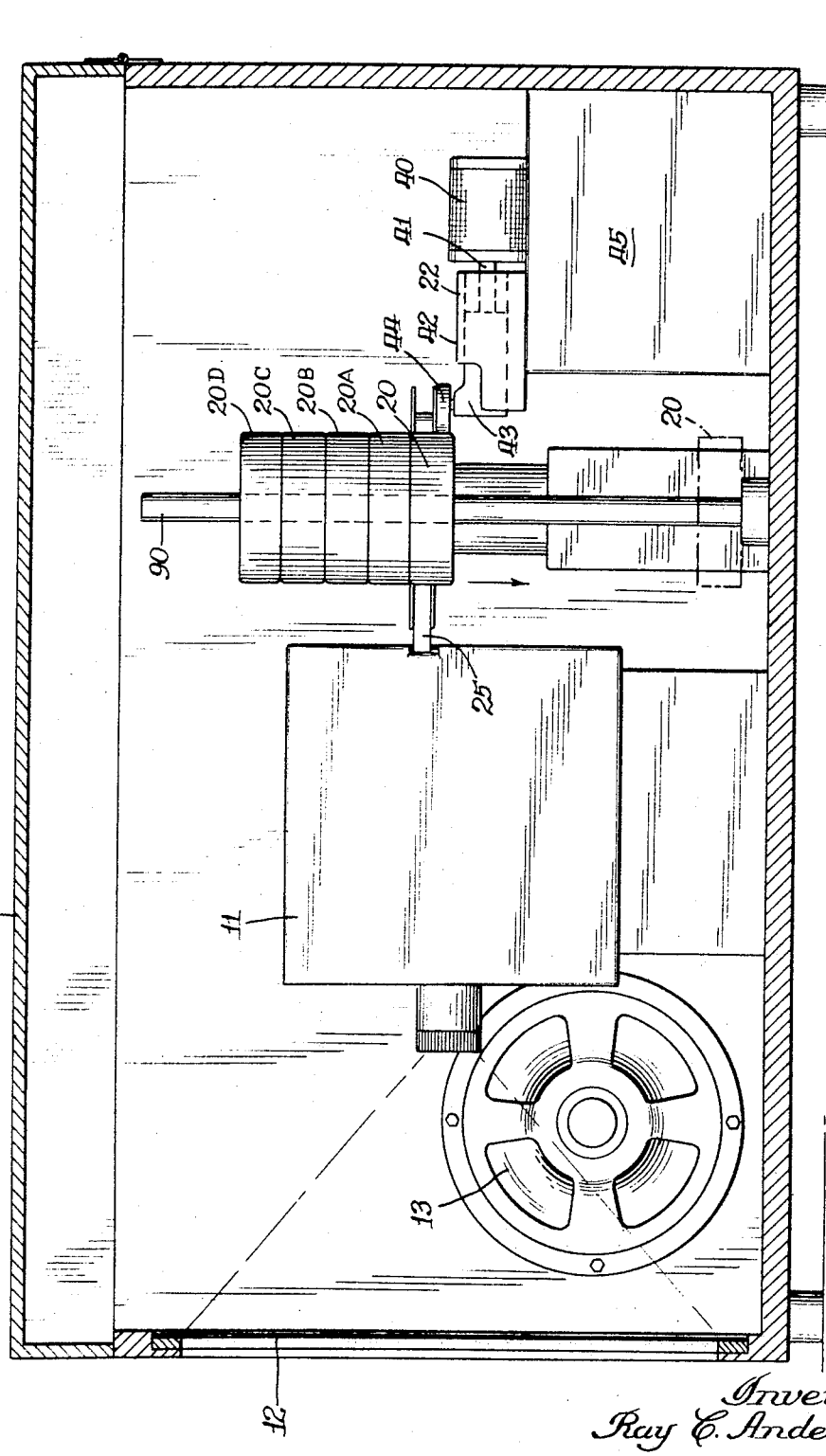

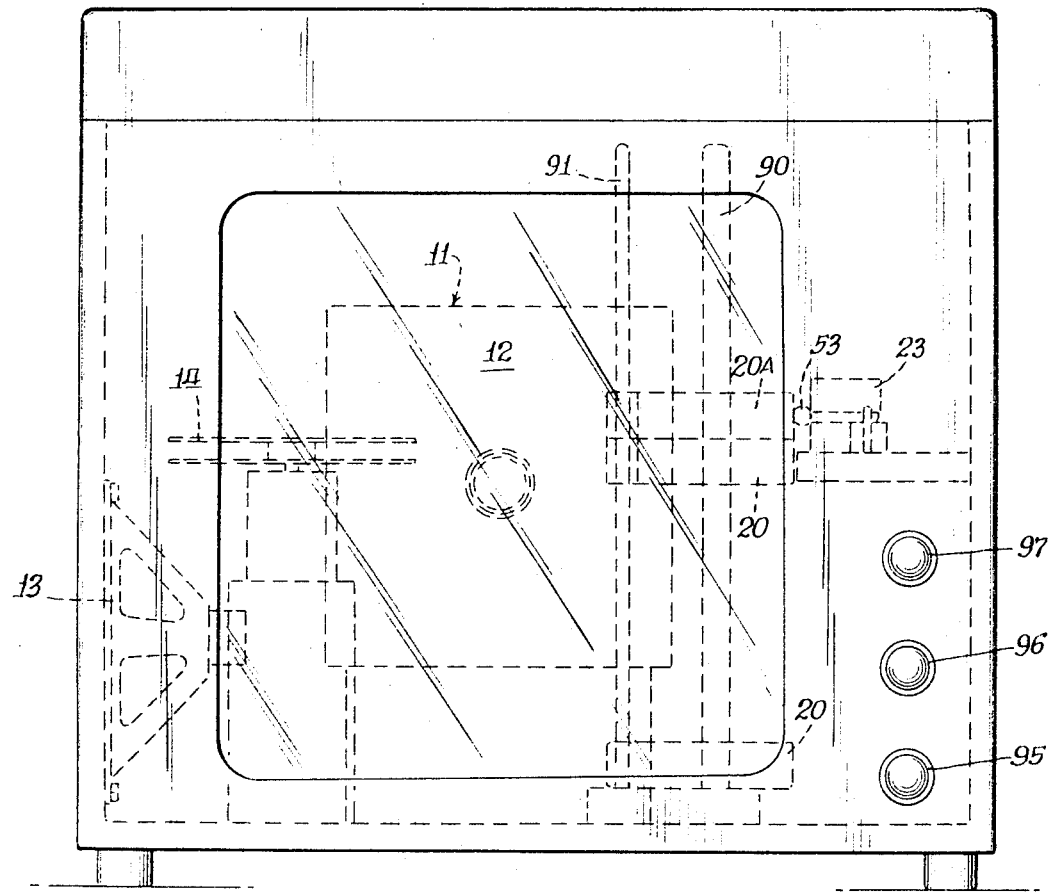
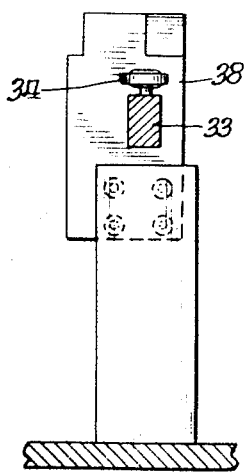
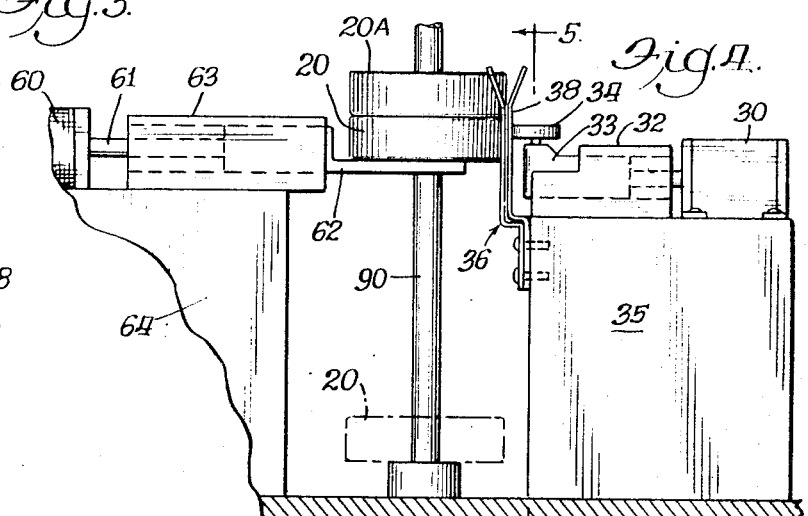

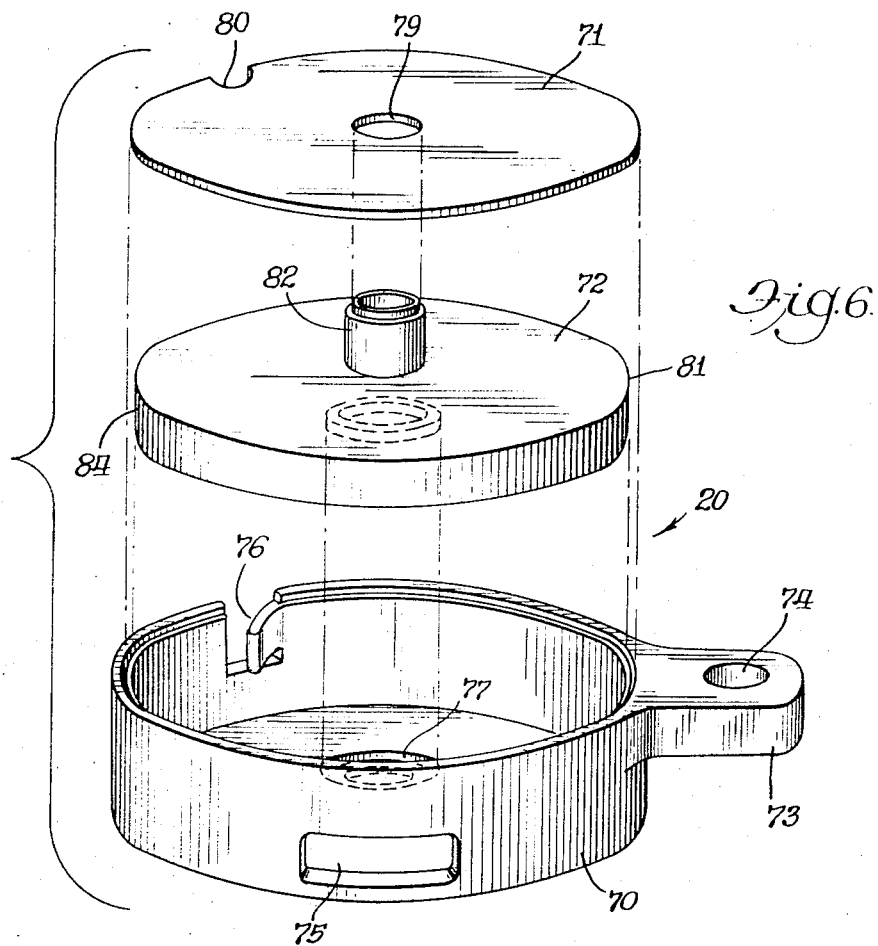
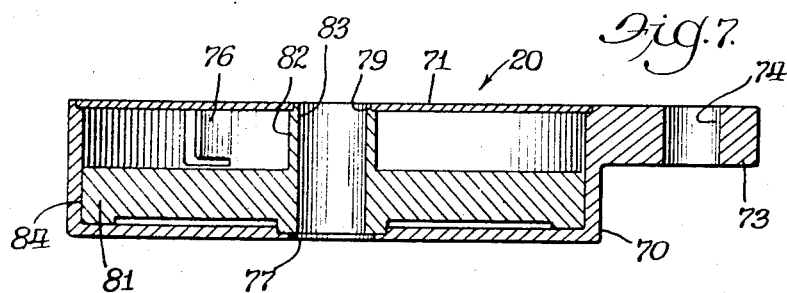
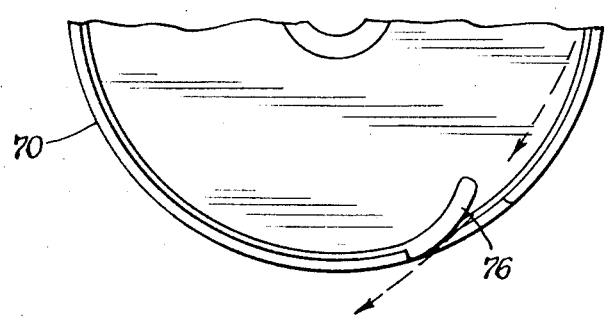

FILM CASETTE

This is a divisional application of may copending U.S. application Ser. No. 806,619 filed Mar. 12, 1969 on a Projector Player, now U.S. Pat. No. 3,687,560.

This invention relates to a film clip or casette for use in a motion picture projector.

It is an object of this invention to provide a film containing casette having means on the casette for allowing the projector mechanism with which it is adapted to be associated to pick up and advance automatically the film into the associated projector and then rewind the film into the casette.

BRIEF DESCRIPTION OF THE DRAWINGS

FIG. 2 is a side view of the interior of the projector player;

FIG. 3 is a front view of the player and showing a phantom view of the interior;

FIG. 4 is a fragmentary view of a portion of the film feed and drive mechanism;

FIG. 5 is an end view taken on line 5—5 of FIG. 4;

FIG. 6 is an exploded view of a film clip or casette;

FIG. 7 is a cross-sectional view of the film clip; and

FIG. 8 is a fragmentary view of a portion of the film clip showing the slot through which the film escapes.

Like characters of reference designate like parts in the several views.

DESCRIPTION OF A PREFERRED EMBODIMENT

Figure 1:
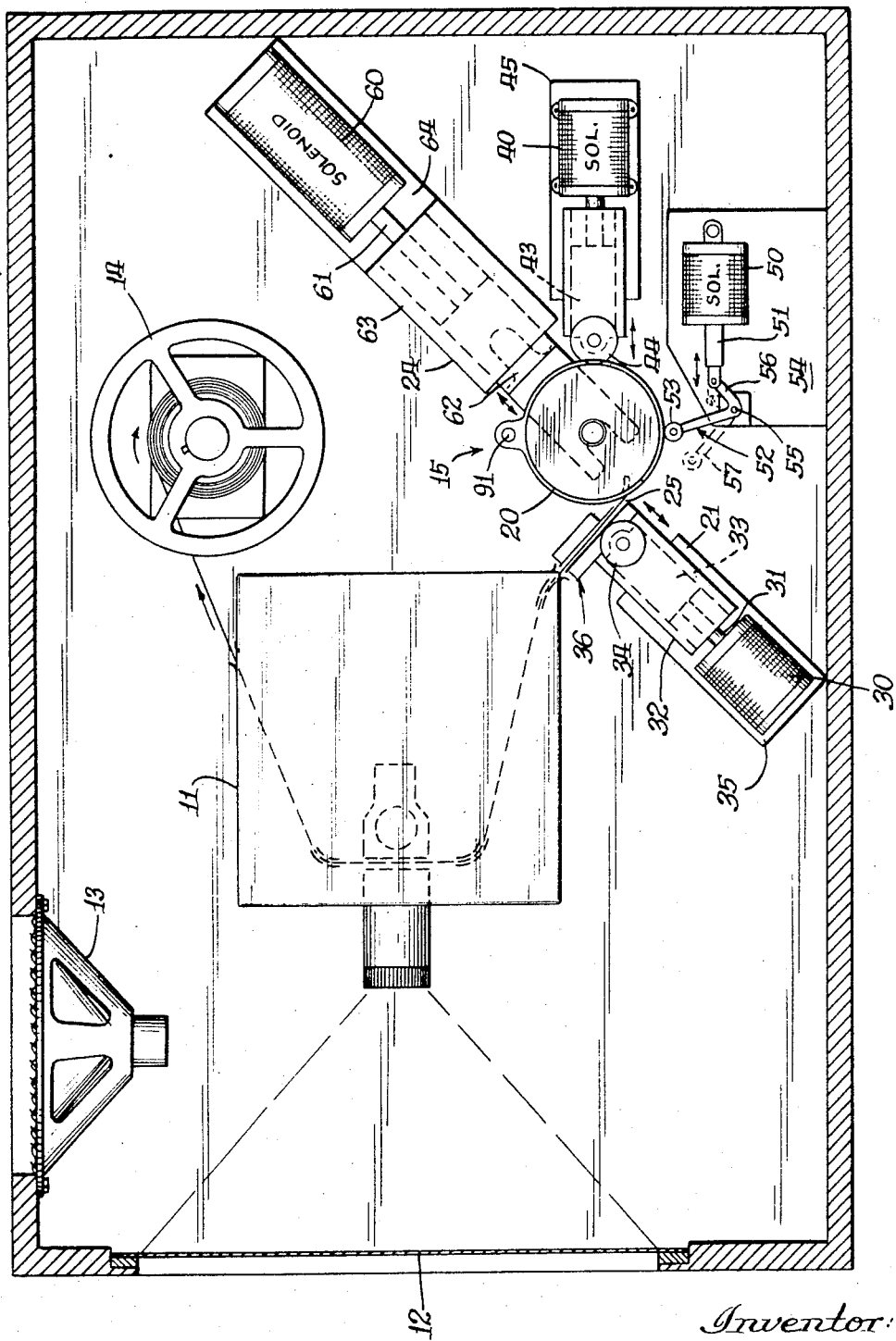
FIG. 1 is a top view showing the interior of a projector player embodying the present invention.

The projector player of the present invention is designated generally by the numeral 10 and comprises a self-threading projector 11, a rear projection screen 12, a speaker 13, a take-up reel 14, and a film selector and ejector mechanism 15 all contained within a case or housing 16.

The film selector and ejector mechanism 15 is designed to operate on a plurality of film clips or casettes 20 and generally comprises a film advance mechanism 21, a film reversing mechanism 22, a film clip retaining mechanism 23, and a film clip ejector mechanism 24. A sound track film 25 is contained within the casette 20 and is fed through the projector 11 to the take-up reel 14.

The film advance mechanism 21 comprises a solenoid 30 having a longitudinally movable armature 31, a guide block 32, a right angle drive electric motor 33 carrying a drive wheel 34, and a mounting base 35. The armature 31 is connected to the motor 33 and is effective to move it longitudinally, when the solenoid 30 is energized, so that the drive wheel 34 contacts the film 25 and advances it into the projector 11. The guide block 32 is fixedly mounted on the base 35 and constrains the motor 33 to be moved in only one dimension. A film guide 36 comprising a pair of thin metal strips 37 and 38 are also mounted on the base 35. The strips 37 and 38 are flared outwardly at their upper ends for receiving the film of another casette 20A as it drops into the play position.

The film reversing mechanism 22 is similar to the film advance mechanism 21, and comprises a solenoid 40 having a longitudinally movable armature 41, a guide block 42, a right angle drive electric motor 43 carrying a drive wheel 44, and a mounting base 45. When the solenoid 40 is energized, the armature 41, connected to the motor 43, moves the drive wheel 44 into a drive position in contact with the film spool carrying the film 25 to return it into the casette 20. The direction of rotation of the drive wheel 44 is opposite from that of the drive wheel 34, as should be apparent.

The film clip retaining mechanism 23 comprises a solenoid 50 having a longitudinally movable armature 51, a bell crank 52 carrying a friction roller 53, and a mounting base 54. The bell crank 52 is pivoted on a pin 55 and is connected by one of its arms 56 to the armature 51. When the solenoid 50 is de-energized, the bell crank 52 is in the dotted-line position 57. When the solenoid 50 is energized, the armature 51 moves to the right and swings the bell crank 52 into the solid-line position shown where the roller 53 contacts a casette 20A which lies on top of the casette 20. The roller 53 is effective to hold the casette 20A in the position shown until the solenoid 50 is de-energized.

The ejector mechanism 24 comprises a solenoid 60 having a longitudinally movable armature 61 connected to a fork 62, a guide block 63, and a mounting base 64. When the solenoid 60 is de-energized, the fork 62 is in its outermost position as shown by the dotted lines in FIG. 1 where it supports the casette 20 during the cycle while the film is being played and rewound. When the solenoid 60 is energized, the armature 61 and fork 62 are retracted into the guide block 63 so that the casette 20 falls out of the play position.

The film clip or casette 20 may comprise a generally cylindrical pan-shaped plastic or metal housing or case 70, a circular lid 71, and a film spool 72. The case 70 is formed with an integral, radially extending flange or handle 73 having a vertically extending aperture 74, a circumferentially extending aperture 75 in the wall of the case 70 through which the drive wheel 44 may extend, and a tangentially opening slot 76 through which the film 25 is advanced and retracted. The bottom of the case 70 is also formed with a centrally disposed circular opening 77, and the upper edge of the case 70 is formed with a stepped circular shoulder 78 for retaining the lid 71.

The lid 71 is formed with a central circular aperture 79 and a semi-lunar opening 80 at its edge. The opening 80 provides access to the interior for manually feeding the film 25 through the slot 76, if required.

The spool 72 has a large diameter disc 81 and a small diameter hub 82 on which the film 25 is wound. An axial central bore 83 is formed through the spool 72 and registers with the openings 77 and 79. The disc 81 is only slightly smaller than the interior diameter of the case 70 and the spool 72 is adapted to rotate within the case 70. The outer periphery 84 of the disc 81 is exposed through the aperture 75.

The film casette 20 is inserted into the player 10 by mounting it on a vertical guide rod or spindle 90 which extends through the bore 83. For multiple play use, a plurality of casettes 20A, 20B, 20C and 20D, for example, may be stacked on top of the casette 20. A second vertical rod 91 extends through the aperture 74 of each of the casettes 20–20D and prevents relative rotation of the casettes about the rod 90. The casettes are stacked in the position shown in FIG. 2 with about an inch or two of film extending out of the slots 76 sufficient to be received by the flared strips 37 and 38 of the film guide 36.

Referring to FIG. 3, control buttons 95, 96 and 97 are shown and are connected to suitable electrical switches and timers (not shown) for operating the player 10. The switch 95 is an "On-Off" control for switching on the power to the player 10. Switch 96 is a "Play" control for starting the cycle of operation. Switch 97 is a "Regular-Long Play" control for setting the time of the cycle according to the length of film in the casette 20. Appropriate timing mechanisms are provided in the apparatus to control the viewing time, rewind time, and ejection time.

In operation, the casettes 20–20D are inserted in the player 10 as described above with the casette 20 resting on the fork 62 of the ejector mechanism 24. Switching the control button 95 to "On" supplies power to the player 10. Switching the "Play" control button 96 on starts the cycle. The control 97 is previously set to correspond with the length of film being played.

The solenoid 30 and motor 33 are actuated to bring the drive wheel 34 into contact with the free end of the film 25. The wheel 34 forces the film 25 through the guide 36 into the projector 11. After the film is taken up by the projector 11, the motor 33 and drive wheel 34 continue to run for a minute period of time to insure takeover by the projector feed. Then the solenoid 30 and motor 33 are de-energized by a timer (not shown). The film 25 is self-fed through the projector 11 and is picked up by the take-up reel 14. The film is projected on the screen 12 and the sound on the film track is played through the speaker 13. A timer (not shown) determines when the film is at an end.

At the end of the film, the take-up reel 14 stops, the lamp in the projector 11 goes out and the projector 11 reverses or disengages, and the speaker 13 cuts out. The rewind solenoid 40 and motor 43 are energized and the drive wheel 44 is moved through the aperture 75 into contact with the surface 84 of the disc 81. The motor 43 thus rewinds the film 25 into the casette 20 while the take-up reel 14 and its drive mechanism provide sufficient drag to insure smooth even flow of the film 25 into the casette 20.

After the film 25 has been completely rewound into the casette 20, the solenoid 40 is de-energized permitting retraction of wheel 40. Then the solenoid 50 of the retaining mechanism 23 is actuated and the bell crank 52 brings the friction roller 53 into contact with the casette 20A. The solenoid 60 of the ejector mechanism 24 is energized next to withdraw the fork 62 from beneath the casette 20. The casette 20 is permitted to fall to the bottom of the rod 90 while the remaining casettes are held in place by the retaining mechanism 23. The solenoid 60 is then de-energized and the fork 62 returns to its original position. The solenoid 50 is then de-energized and the friction roller 53 removed permitting the stack of remaining casettes 20A–20D to fall into place with the casette 20A in the play position resting on the fork 62. The end of film projecting from the casette 20A is picked up by the film guide 36, the solenoid 30 and motor 33 are energized and the play cycle is repeated.

There has been shown and described an automatic projector player effective to project, rewind and advance in sequence a plurality of encased sound films. It is to be understood that the embodiment shown and described is by way of example only, and the invention is not to be considered as limited thereto except insofar as the claims may be so limited.

I claim:

1. In a film casette adapted to be used in a film projector, the combination comprising:
    a housing having central aperture means therein for allowing a mounting spindle to extend therethrough;
    a relatively large diameter disc rotatably disposed in and coaxial with said housing;
    a reel portion of relatively smaller diameter than said disc connected to said disc forming an axial extension thereof and disposed co-axially therewith, said reel portion being adapted to receive a film strip thereon;
    means defining a bore through said disc and reel portion;
    said bore and said central aperture means being in registry with each other in their assembled relation and adapted to receive non-engagingly a mounting spindle therethrough so that said disc and reel portion may rotate freely on said mounting spindle;
    means defining an opening in the periphery of said housing adapted to receive therethrough means for contacting said disc and imparting rotational movement to said disc and said reel portion associated with said disc;
    film feed slot means formed in the periphery of said housing; and
    lug means formed integrally with the periphery of said housing including means for positioning the casette in a non-rotatable position in a playing apparatus, said positioning means being adapted to engage co-operating means on the projector.

2. In a film casette adapted to be used in a film projector the combination comprising:
    a housing having central aperture means therein for allowing a mounting spindle to extend therethrough;
    a film reel disposed in said housing;
    means defining an axial bore through said reel;
    a cover plate for said housing having a second central aperture formed therein;
    said bore, first and second apertures all being coaxially disposed with each other in their assembled relation and adapted to receive non-engagingly a mounting spindle therethrough;
    means defining an opening in the periphery of said housing adapted to receive therethrough means for imparting rotational movement to said reel;
    film feed slot means formed in the periphery of said housing; and
    lug means formed integrally with the periphery of said housing including means for positioning the casette in a non-rotatable position in a playing apparatus, said positioning means being adapted to engage co-operating means on the projector.

3. In a film casette adapted to be used in a sound film projector, the combination comprising:
    a substantially cylindrical dish-shaped housing having a first central aperture formed therein for allowing a mounting spindle to extend therethrough;
    a relatively large diameter disc rotatably disposed in and coaxial with said housing;
    a reel portion of relatively smaller diameter than said disc connected to said disc and disposed coaxially therewith, said reel portion being adapted to receive a film strip thereon;

means defining a bore through said disc and reel portion;

a cover plate for said housing having a second central aperture formed therein;

said bore, first and second apertures all being in registry with each other in their assembled relation and adapted to receive non-engagingly a mounting spindle therethrough so that said disc and reel portion may rotate freely on said mounting spindle;

means defining an opening in the periphery of said housing adjacent said relatively large diameter disc and adapted to receive therethrough means for imparting rotational movement to said disc;

film feed slot means formed in the periphery of said housing; and lug means formed integrally with and extending outwardly from the periphery of said housing including means for positioning the casette in a non-rotatable position in a playing apparatus, said positioning means being adapted to engage cooperating means on the projector.

* * * * *